H. CASLER.
CENTER INDICATOR.
APPLICATION FILED MAY 28, 1914.
1,252,777.
Patented Jan. 8, 1918.
2 SHEETS—SHEET 2.
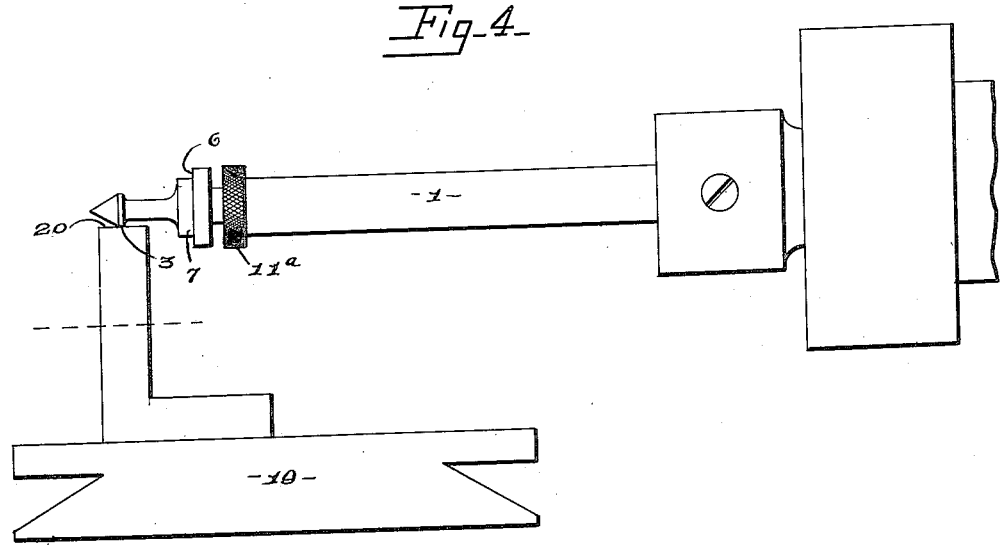
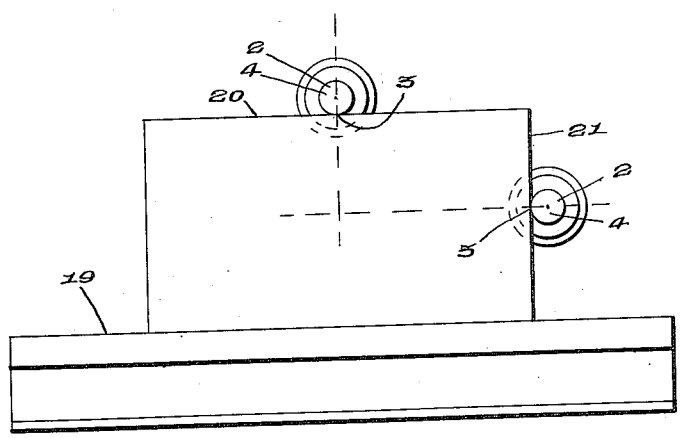
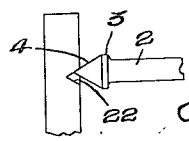

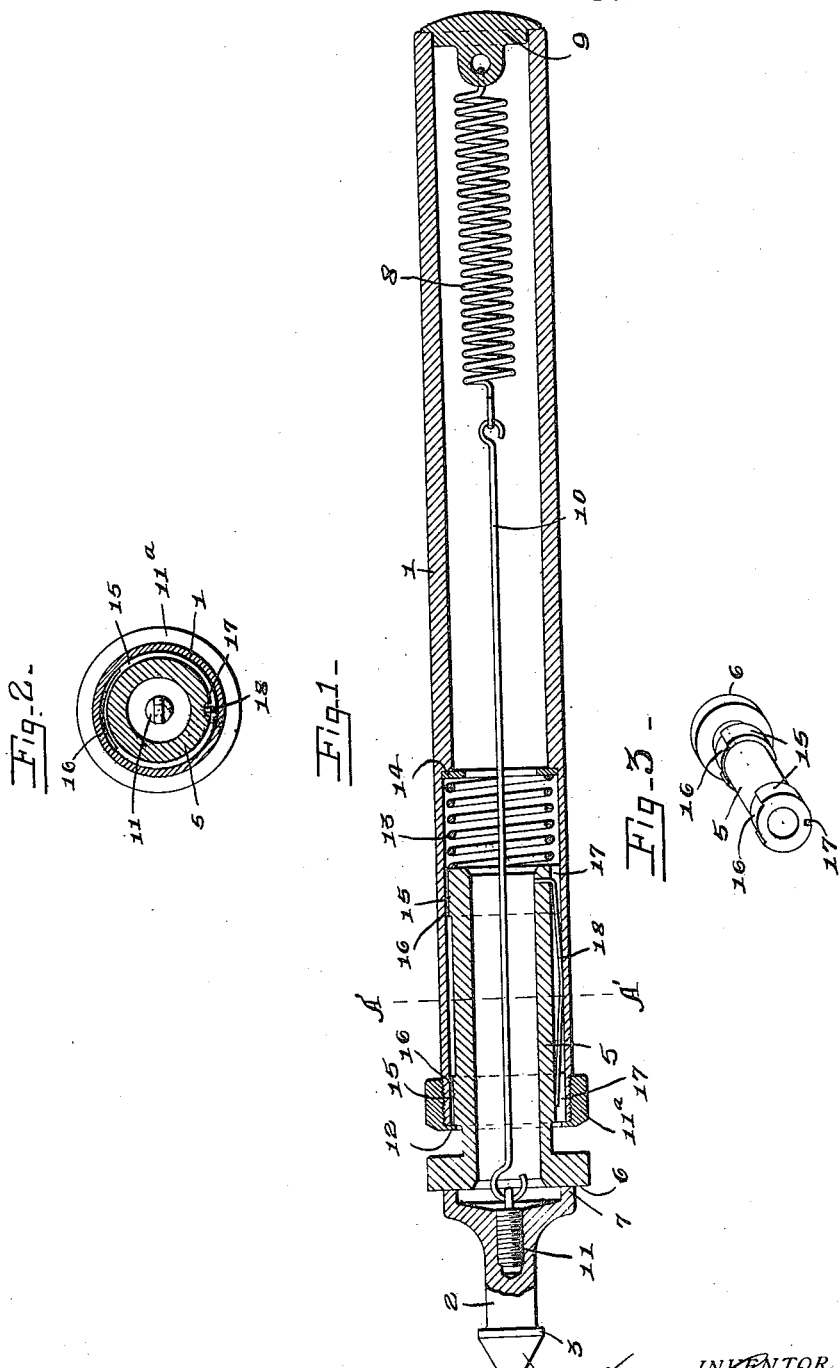

UNITED STATES PATENT OFFICE.

HERMAN CASLER, OF CANASTOTA, NEW YORK.

CENTER-INDICATOR.

1,252,777.

Specification of Letters Patent.  Patented Jan. 8, 1918.

Application filed May 28, 1914. Serial No. 841,480.

*To all whom it may concern:*

Be it known that I, HERMAN CASLER, a citizen of the United States, and a resident of Canastota, in the county of Madison and State of New York, have invented a certain new and useful Center-Indicator, of which the following is a specification.

This invention has for its object a center indicator or instrument for locating accurately the center or axis of a rotating spindle or shaft; and the invention consists in the novel combinations and constructions hereinafter set forth and claimed.

In describing this invention, reference is had to the accompanying drawings, in which like characters designate corresponding parts in all the views.

Figure 1 is a longitudinal sectional view of this instrument.

Fig. 2 is a cross-sectional view on line A—A, Fig. 1.

Fig. 3 is a detail view of the face plate member.

Figs. 4 and 5 are views taken at a right angle to each other illustrating one use of this instrument.

Fig. 6 is a diagrammatical view illustrating another use thereof.

This instrument is designed to be used in connection with a boring head, or other rotating part as the spindle of a machine tool or a chuck mounted thereon, to enable the operator to bring the center of a rotating spindle carrying a drill or boring tool in position to drill or bore holes which are to be located known distances throughout the work, or to position the spindle carrying a drill or boring tool concentric with a center punch mark located at the center of a hole to be bored.

This instrument can also be used to indicate the center of any rotating spindle, such as those used in boring mills, drill presses, lathes, etc.

This center indicating instrument comprises a body or holder 1, a pointer at one end of the body and shiftable laterally relatively to the axis of rotation of the body and having a surface engaging, during the rotation of the body, finished surfaces of the work on which a center is to be located, the body being usually provided with means having a face plate at one end, and the pointer having a base slidably engaging the face plate.

1 designates the body which is here shown as tubular in form and designed to be gripped in a drill chuck or in any other suitable manner attached to a rotating spindle. 2 is the pointer located at one end of the body and having a peripheral surface 3 of known diameter for engaging finished surfaces of the work on which a center is to be located, the pointer also having a conical point 4 in advance of the surface 3. The part 2 is called a pointer merely for convenience, but is not strictly a pointer, as it does not actually point out anything, but merely by its position as shown by its wabbling or lack of wabbling discloses the relative position of an axis of rotation. Furthermore, it is not necessary in one use of this instrument that the member 2 be provided with a point.

5 designates the means provided with a face plate 6 at its outer end against which the base 7 of the pointer bears, the contact surfaces between the pointer and the face plate being hardened and ground to true flat surfaces. The pointer is free to float over the face plate or move laterally relatively to the axis of rotation of the body 1 and member 5. The surface 3 of the pointer is ground to some known diameter and is usually exactly $\frac{1}{4}''$ in diameter. The pointer is held against the face plate by a spring connected to the pointer at substantially the axis thereof so that the tension of the spring holds the base of the pointer against the face plate.

8 designates the spring located within the body 1 and connected at one end to a cap 9 at the outer end of the body and at its other end to a rod 10 extending through the member 5 and secured to the plug 11 threading into an axial socket in the pointer 2. 11ª is a nut threading on the end of the body opposite to that on which the cap 9 is located and having a shoulder 12 bearing against a shoulder on the member 5 for holding the member 5 from removal. The member 5 is pressed outwardly against the shoulder 12 by a spring 13 located within the body 1 and bearing at one end against an abutment 14 and at its other end against the rear end of the member 5.

As it is extremely difficult to accurately slidably fit one metal part within another so that there is no looseness or no binding, and as it is essential to the accurate operation of the pointer 2 that the member 5 have not the slightest lateral play relatively to the body 1, I have provided a particularly simple means whereby both looseness and binding are prevented.

As here shown, the portion of the member 5 within the body 1 engages the inner face of the body at four points on its periphery, two of such points being located at each end, and a spring bears against the inner wall of the body 1 midway between the points and between the ends of the member 5 and tends to hold the four points engaged with the inner face of the wall 1.

As best seen in Figs. 1 and 3, the member 5 is formed with hubs 15 spaced apart, the hubs having peripheral recesses 16 extending part way around the same, the recess of one hub being alined with that of the other, the hubs also having recesses 17 located diametrically opposite the middles of the recesses 16 and midway between the ends of the recesses 16, and a bowed spring 18 is arranged with its ends seated in the recesses 17 and its intermediate portion bearing against the inner face of the body 1.

The hubs 15 of the member 5 are small enough to pass through the shoulder 12 when they are central thereof and cannot pass through the shoulder when held eccentric thereto by the spring 18.

In the use of this instrument, the body 1 thereof is clamped in a spindle or chuck which is to receive a drill or boring tool. The pointer 2 is then moved over the face plate 6 to one side, that is, eccentric to the axis of rotation of the body 1, so that when the pointer is rotated by the drill chuck the pointer will wabble or describe a circle. As the spindle and the body 1 rotate, the work table, as 19, of the machine tool is raised by the mechanism with which the machine tool is provided for raising the work table, moving the work toward the surface 3 of the pointer, and as the pointer is moving in a circle or wabbling, the surface 3 thereof will alternately strike the finished surface 20 of the work, and as the table is gradually raised the pointer will gradually recede toward the axis of rotation of the body until the axis of the pointer and the axis of rotation are coincident and the pointer runs true. If the table is raised too far, the pointer will suddenly creep along the finished surface 20, the direction of the creep being dependent on the direction of rotation of the spindle. When this creeping takes place, the table is again lowered a trifle and the pointer moved off the center of the face plate and the table raised again until the pointer again runs true. If the center to be located is to be for instance 1″ from the surface 20 of the work, the table is raised 1⅛″ which will locate the center in a horizontal line one inch below the surface 20 as the center of rotation of the pointer is ⅛″ above said surface 20 owing to the fact that the surface of the pointer is ¼″ in diameter. The horizontal line in which the center is to be located having been found, the vertical line may be found in the same way by shifting horizontally the work carriage in the well known manner until the vertical face 21 coacts with the peripheral surface 3 of the pointer, and when the pointer runs true, the work carriage is shifted 1⅛″ if the hole is to be also located one inch from the vertical edge 21.

The conical point 4 is intended for use in less accurate work than when the surface 3 is used, as work in which the center has been indicated by punch mark. In this use of the instrument, the pointer is made to run true by bringing it against any flat surface on the table or the work and afterward bringing the pointer concentric with the punch mark.

During the bringing of the pointer concentric with the punch mark, the member 5 is pressed inwardly against the action of the spring 13 and thus injury to the indicator is prevented by binding of the pointer on the work. In moving the work carriage to bring the work with the center punch mark thereon against the point 4 if the point 4 is not accurately alined with the punch mark 22, the pointer 2 will be forced or shifted laterally relatively to the axis of rotation of the spindle of the body 1, as it enters the punch mark and hence will wabble as it leaves the work, and when this wabbling takes place, the pointer is again adjusted to run true and the work carriage shifted and the test repeated, these tests being repeated until the pointer 2 is not forced off center when brought into engagement with the center punch mark.

What I claim is:

1. A center indicator comprising a body designed to be carried by a rotating part of a machine tool, means associated with the body and having a flat face plate, and a pointer having a flat face engaging the face plate, means connecting the pointer and the body, said means operating to permit the pointer to shift on the face plate laterally relatively to the axis of rotation of the body, the pointer also having a surface for engaging, during the rotation of the body, a surface of the work on which a center is to be located, substantially as and for the purpose specified.

2. A center indicator comprising a body designed to be carried by a rotating part of a machine tool, a pointer at one end of the body shiftable laterally relatively to the axis of rotation of the body, and means for holding the pointer on the body comprising a spring arranged to force the pointer axially against one end of the body, substantially as and for the purpose set forth.

3. A center indicator comprising a body designed to be carried by a rotating part of a machine tool, a pointer at one end of the body, the pointer and the body having engaging faces arranged at an angle to the axis of the body so that the pointer is shiftable laterally relatively to the axis of rotation of the body, and means for holding the pointer on the body comprising a spring, the spring being connected to the base of the pointer at substantially the axis thereof and being arranged to exert its tension on the pointer in a direction lengthwise of the body to hold the pointer against the body, substantially as and for the purpose described.

4. A center indicator comprising a body designed to be carried by a rotating part of a machine tool, means associated with the body and having a face plate at one end thereof, and a pointer having a base slidably engaging said face plate and shiftable laterally thereon relatively to the axis of rotation of the body, the pointer having a surface for engaging, during the rotation of the body, a surface of the work on which a center is to be located, and a spring connected to the base of the pointer substantially at the axis thereof and arranged to exert its tension lengthwise of the body to hold the pointer against the face plate and permit the lateral shifting of the pointer, substantially as and for the purpose specified.

5. A center indicator comprising a body designed to be carried by a rotating part of a machine tool, a pointer movably mounted on the body at one end thereof, and means for movably connecting the pointer and the body, the pointer and the body having coacting guiding surfaces arranged at a right angle to the axis of the body for guiding the pointer laterally relatively to the axis of rotation of the body, and the pointer also having a peripheral surface for engaging during the rotation of the body, the work on which a center is to be located, substantially as and for the purpose described.

6. A center indicator comprising a body designed to be carried by a rotating part of a machine tool, means associated with the body and having a face plate, and a pointer having a flat face engaging the face plate, means connecting the pointer to the body, said means permitting the pointer to shift laterally relatively to the axis of rotation of the body, the pointer also having a peripheral surface for engaging during the rotation of the body the work on which a center is to be located, substantially as and for the purpose described.

7. A centering instrument comprising a hollow body having a tubular portion, a laterally shiftable pointer, and a member carrying the pointer and slidable in the body, the periphery of the member engaging the inner surface of the hollow body at a plurality of points spaced apart, and means for resisting the sliding movement of said member, substantially as and for the purpose described.

8. A centering instrument comprising a body having a tubular portion, a pointer, a member carrying the pointer and slidable in the body, the periphery of the member engaging the inner surface of the body at a plurality of points spaced apart, and including a distance less than one-half of the circumference of said member, and a spring pressing the member to hold said points against said surface, substantially as and for the purpose specified.

9. An instrument comprising a body including a tubular portion, a member slidable in the body, said member being recessed part way around the periphery thereof and the recessing opening through the ends of said member, a spring between the member and the inner wall of the body, the spring being located on the side of the member opposite to that on which the recessing is located and substantially midway between the ends of the recessing whereby said member bears against the inner face of the body on opposite sides of the recessing and the spring bears against the inner face of the body midway, measuring around said member, between the points at which said member engages the inner wall of the body, substantially as and for the purpose set forth.

10. An instrument of the class described comprising a body having a tubular portion, a member slidable in the tubular portion and having hubs thereon spaced apart for engaging the inner face of the body, the hubs being formed with alined peripheral recesses extending part way around the same and with recesses in the portions thereof diametrically opposite the middles of the former recesses, and spring means located in the last-named recesses and bearing on the inner face of the body, substantially as and for the purpose described.

11. A centering instrument comprising a body having a tubular portion, a pointer, a member carrying the pointer and slidable in the body, the pointer and the member having surfaces arranged at an angle to the axis of the body and the surface of the pointer slidably engaging with that of the body, means for holding the pointer with its surface engaged with the surface of the body, the periphery of the member engaging the inner surface of the body at a plurality of points, a spring located within the body and pressing outwardly axially on the inner end of said member, a spring tending to hold said member with its points engaged with the inner wall of the body, and means for limiting the outward movement of said member, substantially as and for the purpose set forth.

12. A centering instrument comprising a body having a tubular portion, a member slidable in the tubular portion of the body, and having hubs thereon spaced apart for engaging the inner face of the body, the hubs being formed with alined peripheral recesses extending part way around the same and with recesses in the portions thereof diametrically opposite the middles of the recesses, spring means located in the last-named recesses and bearing on the inner face of the body, a spring located within the body and pressing outwardly axially on the inner end of said member, and means for limiting the outward movement of said member, substantially as and for the purpose described.

13. A centering instrument comprising a tubular body designed to be carried in the rotating part of a machine, the body being formed with a face plate at one end, a pointer having a base mounted on the face plate and shiftable laterally relatively to the axis of rotation of the body and having a surface for engaging during the rotation of the body, the work on which a center is to be located, and a coiled spring located within the body and secured at one end within the body and having its other end connected to the pointer at substantially the axis of the pointer, substantially as and for the purpose specified.

14. A centering instrument comprising a tubular body designed to be carried by a rotating part of a machine, a member slidable in the body and having a face plate at its outer end, a pointer having its base mounted on the face plate, the pointer being shiftable laterally relatively to the axis of rotation of the body, the portion of the member within the body engaging the inner face of the body at a plurality of points spaced apart, a spring located to press the member to hold said plurality of points engaged with the inner face of the body, a spring acting on the inner end of the member acting to force the same outwardly, a shoulder for limiting the outward movement of the member, and a spring located within the body and secured at one end thereto and connected at its other end to the pointer at substantially the axis thereof and tending to hold the base thereof engaged with the face plate, substantially as and for the purpose set forth.

In testimony whereof, I have hereunto signed my name, in the presence of two attesting witnesses, at Canastota, in the county of Madison, in the State of New York, this 23rd day of May, 1914.

HERMAN CASLER.

Witnesses:
S. DAVIS,
J. GLAZIER.